United States Patent
Sadakane et al.

(10) Patent No.: US 11,175,497 B2
(45) Date of Patent: Nov. 16, 2021

(54) LAMINATED GLASS

(71) Applicant: AGC Inc., Chiyoda-ku (JP)

(72) Inventors: Shunsuke Sadakane, Tokyo (JP);
Masayuki Takahara, Tokyo (JP);
Yoshinobu Morita, Tokyo (JP); Shingo Wakahara, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/394,631

(22) Filed: Apr. 25, 2019

(65) Prior Publication Data

US 2019/0339517 A1 Nov. 7, 2019

(30) Foreign Application Priority Data

May 7, 2018 (JP) .............................. JP2018-089445
Mar. 26, 2019 (JP) .............................. JP2019-058756
Apr. 22, 2019 (JP) .............................. JP2019-081238

(51) Int. Cl.
*B60J 1/00* (2006.01)
*G02B 27/01* (2006.01)
(Continued)

(52) U.S. Cl.
CPC .......... *G02B 27/0101* (2013.01); *B32B 3/263* (2013.01); *B32B 17/10036* (2013.01); *B32B 17/10541* (2013.01); *B32B 17/10761* (2013.01); *B60J 1/001* (2013.01); *B32B 2307/732* (2013.01); *B32B 2605/006* (2013.01);
(Continued)

(58) Field of Classification Search
CPC ................. B60J 1/00–002; B32B 17/10–1099
See application file for complete search history.

(56) References Cited

U.S. PATENT DOCUMENTS

| | | | |
|---|---|---|---|
| 2016/0250982 A1* | 9/2016 | Fisher .................. | G10K 11/168 428/215 |
| 2017/0015180 A1* | 1/2017 | Sakamoto .................. | B60J 1/02 |

(Continued)

FOREIGN PATENT DOCUMENTS

| | | | |
|---|---|---|---|
| JP | 7-175007 | 7/1995 | |
| JP | 2017105665 A * | 6/2017 | ....... B32B 17/10165 |

(Continued)

OTHER PUBLICATIONS

Machine translation of WO 2019/131802 A1, obtained from EspaceNet (Year: 2020).*

*Primary Examiner* — Z. Jim Yang
(74) *Attorney, Agent, or Firm* — Element IP, PLC

(57) ABSTRACT

A laminated glass includes an interlayer between an exterior glass plate and an interior glass plate; an information acquisition area; and a test area A specified in JIS R3212. The information acquisition area is positioned above the test area A. At least a part of a periphery of the information acquisition area is surrounded by a shielding layer formed of a colored ceramic layer. One of the exterior and interior glass plates is thicker at an upper end than at a lower end. Denoting a degree of thickness difference of the information acquisition area by α and a degree of thickness difference of the test area A by β, a ratio α/β is greater than or equal to 1.01, where α or β is the ratio of thicknesses of the exterior and interior glass plates at the center of gravity of the corresponding area.

18 Claims, 5 Drawing Sheets

| INFORMATION OBTAINING AREA | | TEST AREA A | THICKNESS AT CENTER OF GRAVITY OF INFORMATION OBTAINING AREA, AND DEGREE OF THICKNESS DIFFERENCE α | | | THICKNESS AT CENTER OF GRAVITY OF TEST AREA A, AND DEGREE OF THICKNESS DIFFERENCE β | | | RATIO OF DEGREES OF THICKNESS DIFFERENCE | WEDGE ANGLE | |
|---|---|---|---|---|---|---|---|---|---|---|---|
| TRANSMITTED DISTORTION [mdpt] | TRANSMITTED DISTORTION [mdpt] | | OUTER SHEET [mm] | INNER SHEET [mm] | α | OUTER SHEET [mm] | INNER SHEET [mm] | β | α / β | INNER SHEET [mm] | THINNEST PART OF OUTER SHEET [mm] | WEDGE ANGLE [mrad] |
| COMP. EX. | −145 | −32 | 1.956 | 1.835 | 1.066 | 1.95 | 1.84 | 1.059 | 1.006 | 1.84 | 1.95 | 0.00 |
| EX. 1 | −111 | −77 | 2.271 | 1.86 | 1.221 | 2.168 | 1.859 | 1.166 | 1.047 | 1.86 | 2.04 | 0.34 |
| EX. 2 | −114 | −75 | 2.269 | 1.838 | 1.234 | 2.167 | 1.817 | 1.192 | 1.035 | 1.82 | 2.04 | 0.33 |
| EX. 3 | −130 | −51 | 2.240 | 1.84 | 1.217 | 2.210 | 1.84 | 1.201 | 1.014 | 1.84 | 2.03 | 0.32 |
| EX. 4 | −122 | −60 | 2.265 | 1.85 | 1.220 | 2.190 | 1.84 | 1.190 | 1.025 | 1.84 | 2.04 | 0.33 |

(51) Int. Cl.
    *B32B 17/10*     (2006.01)
    *B32B 3/26*     (2006.01)
    *B60K 35/00*     (2006.01)

(52) U.S. Cl.
    CPC ...... *B60K 35/00* (2013.01); *B60K 2370/1529* (2019.05); *G02B 2027/011* (2013.01)

(56) References Cited

U.S. PATENT DOCUMENTS

| | | | |
|---|---|---|---|
| 2017/0305240 A1* | 10/2017 | Aoki | B32B 3/263 |
| 2017/0334759 A1* | 11/2017 | Yamato | C03B 18/06 |
| 2018/0370843 A1* | 12/2018 | Gross | C03C 3/097 |
| 2020/0209622 A1* | 7/2020 | Niitsu | B32B 17/10761 |
| 2020/0262184 A1* | 8/2020 | Cleary | B32B 17/10119 |
| 2020/0282922 A1* | 9/2020 | Mannheim Astete | B60R 11/04 |
| 2020/0290319 A1* | 9/2020 | Mannheim Astete | B32B 17/10137 |
| 2020/0391488 A1* | 12/2020 | Oota | B32B 17/10165 |
| 2021/0021745 A1* | 1/2021 | Mannheim Astete | H04N 5/2257 |
| 2021/0039358 A1* | 2/2021 | Mannheim Astete | B32B 17/1011 |
| 2021/0053423 A1* | 2/2021 | Kanki | B60J 1/001 |
| 2021/0070019 A1* | 3/2021 | Mannheim Astete | H05B 3/86 |

FOREIGN PATENT DOCUMENTS

| | | | |
|---|---|---|---|
| WO | WO-2019131802 A1 * | 7/2019 | B24B 9/00 |
| WO | WO-2019150044 A1 * | 8/2019 | B32B 17/10082 |
| WO | WO-2020094419 A1 * | 5/2020 | B32B 17/10761 |

\* cited by examiner

FIG.4

| | INFORMATION OBTAINING AREA | TEST AREA A | THICKNESS AT CENTER OF GRAVITY OF INFORMATION OBTAINING AREA, AND DEGREE OF THICKNESS DIFFERENCE α | | | THICKNESS AT CENTER OF GRAVITY OF TEST AREA A, AND DEGREE OF THICKNESS DIFFERENCE β | | | RATIO OF DEGREES OF THICKNESS DIFFERENCE | WEDGE ANGLE | | |
|---|---|---|---|---|---|---|---|---|---|---|---|---|
| | TRANS-MITTED DISTOR-TION [mdpt] | TRANS-MITTED DISTOR-TION [mdpt] | OUTER SHEET [mm] | INNER SHEET [mm] | α | OUTER SHEET [mm] | INNER SHEET [mm] | β | α / β | INNER SHEET [mm] | THINNEST PART OF OUTER SHEET [mm] | WEDGE ANGLE [mrad] |
| COMP. EX. | −145 | −32 | 1.956 | 1.835 | 1.066 | 1.95 | 1.84 | 1.059 | 1.006 | 1.84 | 1.95 | 0.00 |
| EX. 1 | −111 | −77 | 2.271 | 1.86 | 1.221 | 2.168 | 1.859 | 1.166 | 1.047 | 1.86 | 2.04 | 0.34 |
| EX. 2 | −114 | −75 | 2.269 | 1.838 | 1.234 | 2.167 | 1.817 | 1.192 | 1.035 | 1.82 | 2.04 | 0.33 |
| EX. 3 | −130 | −51 | 2.240 | 1.84 | 1.217 | 2.210 | 1.84 | 1.201 | 1.014 | 1.84 | 2.03 | 0.32 |
| EX. 4 | −122 | −60 | 2.265 | 1.85 | 1.220 | 2.190 | 1.84 | 1.190 | 1.025 | 1.84 | 2.04 | 0.33 |

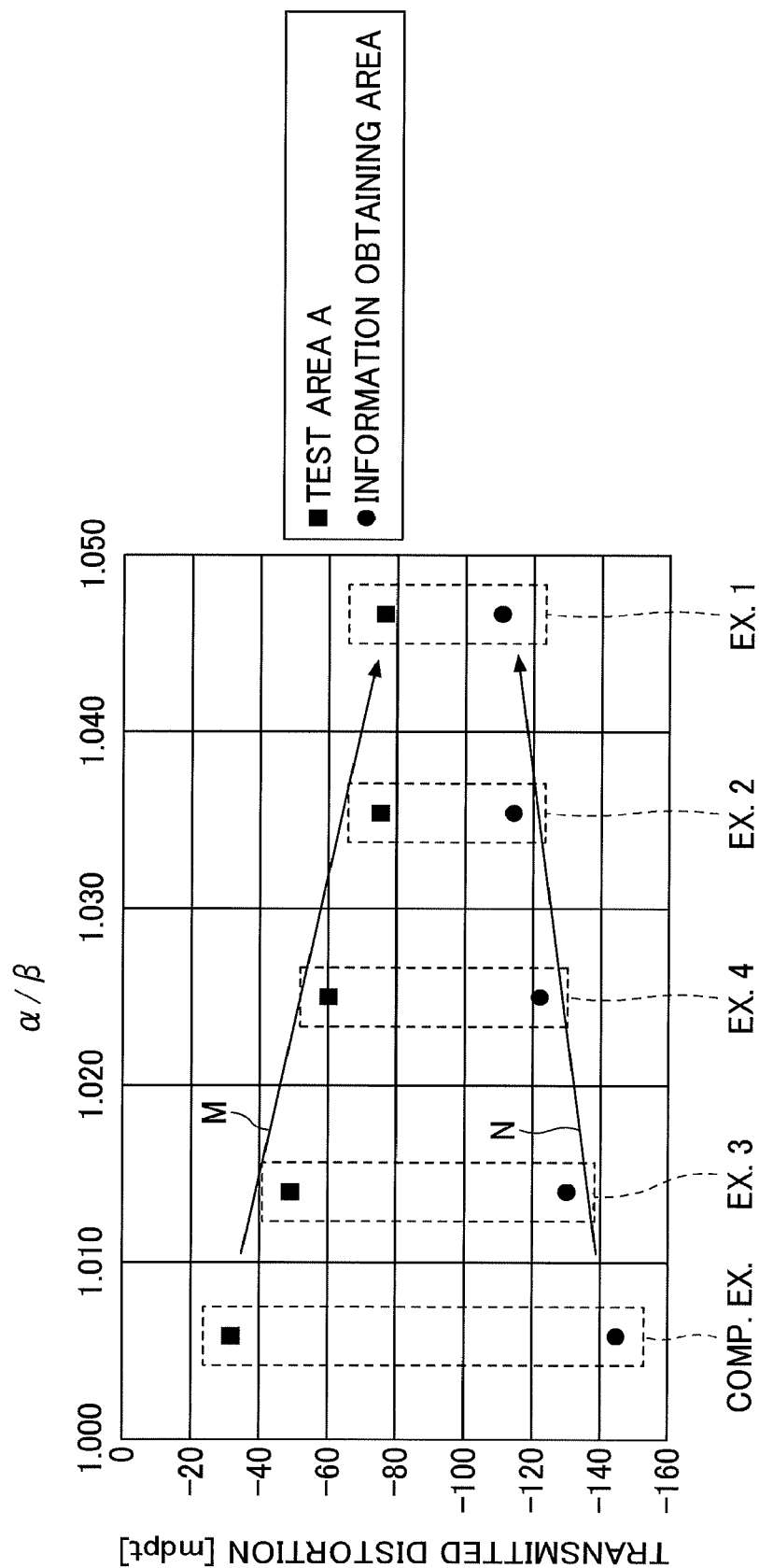

LAMINATED GLASS

CROSS-REFERENCE TO RELATED APPLICATIONS

This application is based upon and claims the benefit of priority to Japanese Priority Application No. 2018-089445 filed on May 7, 2018, Japanese Priority Application No. 2019-058756 filed on Mar. 26, 2019, and Japanese Priority Application No. 2019-081238 filed on Apr. 22, 2019, the entire contents of which are hereby incorporated by reference.

BACKGROUND OF THE INVENTION

1. Field of the Invention

The present disclosure relates to laminated glass.

2. Description of the Related Art

In recent years, introduction of head-up displays (also referred to as "HUD", below) has made progress, with which predetermined information is displayed in the field of vision of the driver of a vehicle, by reflecting images on the windshield of the vehicle. However, there may be cases where double images, such as transmitted double images and reflected double images, pose a problem when the driver is visually recognizing an outside scene or information displayed by the HUD. Thereupon, in the HUD, in order to solve the problem of double images, a laminated glass that includes a part having a wedge shape in cross section is adopted as the windshield (e.g., see Japanese Laid-open Patent Publication No. H07-175007).

Meanwhile, in order to recognize the state of the outside, in some cases, a sensor such as a camera is installed in a vehicle, for example, inside the windshield. In such a case, in order to enable the sensor such as a camera to obtain information, an information acquisition area is provided in a part of the windshield. However, if the transmitted distortion of the information acquisition area is large, the information obtainment performance of the sensor such as a camera deteriorates. In particular, in the case where a shielding layer made of a colored ceramic layer is formed around the information acquisition area, the transmitted distortion is likely to occur when shaping the windshield due to the difference in heat absorption between the colored ceramic and the glass.

Even in the case where such an information acquisition area surrounded by a shielding layer is provided on a laminated glass including a part having a wedge shape in cross section, a technique is required for preventing degradation of the information obtainment performance of a sensor. Note that it is also necessary to visually recognize the scenery outside the vehicle and information displayed by the HUD correctly.

SUMMARY OF THE INVENTION

According to an embodiment, a laminated glass includes an interlayer between a vehicle-exterior-side glass plate and a vehicle-interior-side glass plate; an information acquisition area for a sensor; and a test area A specified in JIS (Japanese Industrial Standards) R3212 (2015). The information acquisition area is positioned higher than the test area A when the laminated glass is mounted to a vehicle. At least a part of a peripheral part of the information acquisition area is surrounded by a shielding layer formed of a colored ceramic layer in plan view. One of the vehicle-exterior-side glass plate and the vehicle-interior-side glass plate has a plate thickness thicker at an upper end part than at a lower end part when the laminated glass is mounted to the vehicle. Denoting a degree of thickness difference of the information acquisition area by $\alpha$ and a degree of thickness difference of the test area A by $\beta$, a ratio $\alpha/\beta$ of the degrees of thickness difference is greater than or equal to 1.01.

Here, $\alpha$ is the ratio of a thickness of the vehicle-exterior-side glass plate to a thickness of the vehicle-interior-side glass plate at a center of gravity of the information acquisition area (a smaller thickness is taken as a denominator), and $\beta$ is the ratio of a thickness of the vehicle-exterior-side glass plate to a thickness of the vehicle-interior-side glass plate at a center of gravity of the test area A (a smaller thickness is taken as a denominator).

BRIEF DESCRIPTION OF THE DRAWINGS

FIG. 4 is a first diagram illustrating examples and a comparative example; and

FIG. 5 is a second diagram illustrating examples and a comparative example.

DESCRIPTION OF THE PREFERRED EMBODIMENTS

In the following, embodiments will be described with reference to the drawings. Throughout the drawings, the same elements are assigned the same reference symbols, and duplicated description may be omitted. Note that although a windshield for a vehicle will be taken as an example for the description here, the application is not limited as such; a laminated glass according to the embodiments can be applied to a glass not only for a windshield, but also for a side glass, a rear glass, and the like for a vehicle. Also, in some of the drawings, the size and shape may be partially exaggerated to facilitate understanding of the contents of the present inventive concept.

According to one embodiment in the disclosure, in the information acquisition area provided in the laminated glass having a wedge-shaped part in cross section, it is possible to improve the information obtainment performance of the sensor, and at the same time, to visually recognize the scenery outside the vehicle and the information displayed by the HUD correctly.

Note that "plan view" refers to viewing a predetermined area of a windshield in the normal direction of the predetermined area, and "planar shape" refers to a shape of the predetermined area of the windshield viewed in the normal direction of the predetermined area.

First Embodiment

Figure 1A:
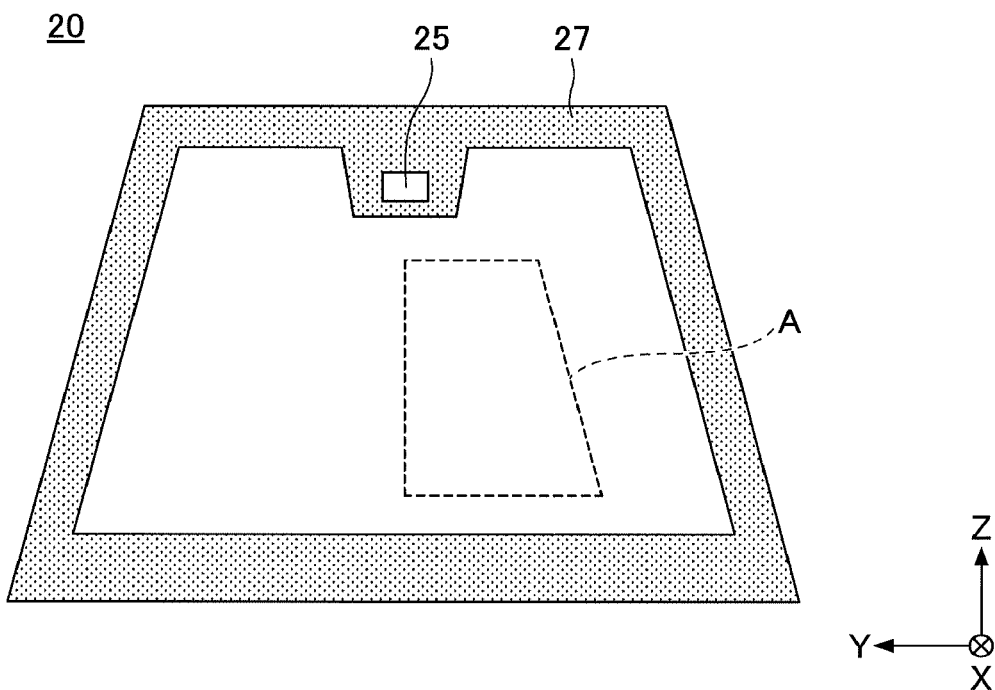
FIGS. 1A-1B are diagrams exemplifying a windshield for a vehicle according to a first embodiment.
Figure 1B:
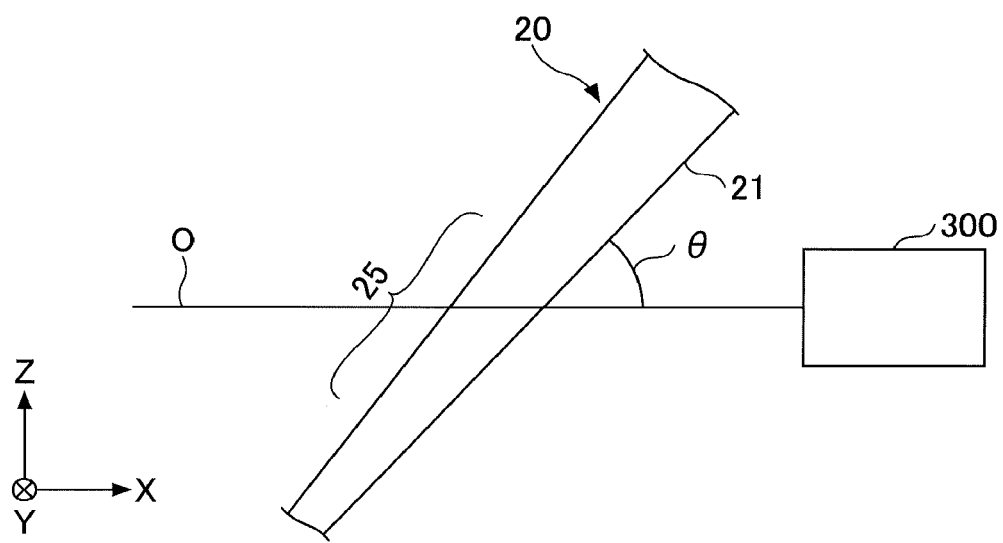

FIGS. 1A-1B are diagrams exemplifying a windshield for a vehicle according to a first embodiment, where FIG. 1A is a diagram schematically illustrating a state in which the windshield is visually recognized from the vehicle interior to the vehicle exterior (the windshield 20 is in a state of being mounted to the vehicle directed upward in the Z direction); and FIG. 1B is a partially enlarged cross-sectional view in the vicinity of an information acquisition area 25 in FIG. 1A. In FIG. 1B, a camera 300 is illustrated together with the windshield 20 for the sake of convenience.

As illustrated in FIG. 1A, the windshield 20 has a test area A specified in JIS R3212 (2015) and the information acquisition area 25. Also, a shielding layer 27 is provided at the peripheral part of the windshield 20. The test area A is positioned inside an area surrounded by the shielding layer 27 in plan view, and the information acquisition area 25 is positioned in an opening provided in the shielding layer 27. Note that when the windshield 20 is mounted to a vehicle, the information acquisition area 25 is positioned higher than the test area A so as not to obstruct the driver's view, and the same time, to be advantageous for obtaining information.

The planar shape of the information acquisition area 25 is, for example, a rectangle, an isosceles trapezoid, or a fan. The area of a part of the information acquisition area 25 surrounded by the shielding layer 27 is, for example, greater than or equal to 1,500 mm$^2$ per opening. Setting the area of a part of the information acquisition area 25 surrounded by the shielding layer 27 to be greater than or equal to 1,500 mm$^2$, enables to secure the angle of view necessary for the sensor such as the camera 300 to obtain information. The area of an opening of the shielding layer 27 where the information acquisition area 25 is positioned may be set to be greater than or equal to 3,000 mm$^2$, greater than or equal to 4,500 mm$^2$, greater than or equal to 6,000 mm$^2$, or greater than or equal to 9,000 mm$^2$.

Also, there may be multiple information acquisition areas 25, for example, in the case where an information acquisition area corresponding to a visible light camera and an information acquisition area corresponding to an infrared sensor are provided separately. In such a case, the above-described area is the area of each of the information acquisition areas. Also, when the periphery of the information acquisition area 25 is not surrounded by the shielding layer 27, an area of the windshield 20 corresponding to the angle of view of the camera or the like is regarded as the information acquisition area 25.

The information acquisition area 25 functions as a transparent area in the case where the camera 300 as a sensor for obtaining visible light or for obtaining infrared light is arranged at the upper peripheral part of the windshield 20. However, the arrangement of the camera 300 is an example, and instead of the camera 300, when a sensor for obtaining visible light is arranged, an information acquisition area 25 capable of obtaining visible light is also provided similarly. As a sensor to obtain visible light, for example, an illumination sensor may be considered. As a camera to obtain infrared light, for example, a night-vision device or a LiDAR (Light Detection and Ranging) device may be considered.

An angle θ formed between the optical axis O of the camera 300 and the inner surface 21 of the windshield 20 is, for example, 60 degrees or less. Although θ may be less than or equal to 50 degrees; less than or equal to 40 degrees; less than or equal to 30 degrees; or less than or equal to 25 degrees, transmitted distortion is more likely to occur with a smaller value of θ, and the effect of the present inventive concept can be further exhibited.

The shielding layer 27 is an opaque, colored (e.g., black) ceramic layer, and can be formed by, for example, applying a printing ink of a predetermined color to a glass surface to be stained. The presence of the opaque shielding layer 27 at the peripheral part of the windshield 20 enables to prevent resin, such as urethane for holding the peripheral part of the windshield 20 on the vehicle body, or an adhesive member to attach a bracket for engaging the sensor such as the camera 300 to the windshield, from deteriorating by ultraviolet light; and further enables to prevent the sensor from malfunctioning due to external light such as sunlight.

Figure 2A:
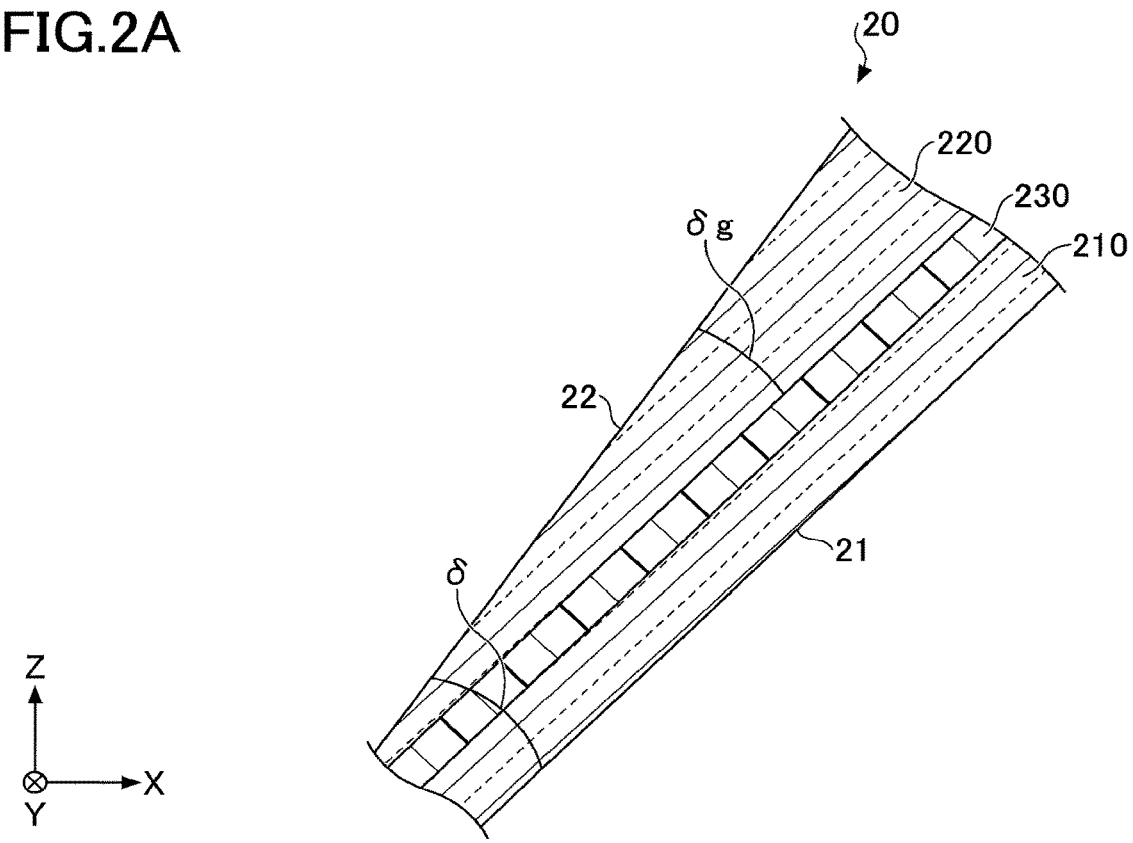
FIGS. 2A-2B are partial cross-sectional views of a windshield 20 illustrated in FIG. 1 sectioned in the XZ direction and viewed in the Y direction.

FIG. 2 is a partial cross-sectional view of the windshield 20 illustrated in FIG. 1 sectioned in the XZ direction and viewed in the Y direction. As illustrated in FIG. 2A, the windshield 20 is a laminated glass for a vehicle provided with a glass plate 210 as the glass plate on the interior side of the vehicle; a glass plate 220 as the glass plate on the exterior side of the vehicle; and an interlayer 230. In the windshield 20, the glass plate 210 and the glass plate 220 are fixed in a state of having the interlayer 230 sandwiched in-between. The interlayer 230 may be formed of multiple interlayers.

Note that although the shielding layer 27 is not illustrated in FIG. 2A, the shielding layer 27 may be provided on the vehicle-interior-side surface of the glass plate 210 (the inner surface 21 of the windshield 20); may be provided on the vehicle-interior-side surface of the glass plate 220; or may be provided on both of these surfaces. In other words, the shielding layer 27 can be provided on one of or both of the vehicle-interior-side surface of the glass plate 210 and the vehicle-interior-side surface of the glass plate 220.

The windshield 20 may have an HUD display area that is located inside the test area A or outside the test area A, and inside an area surrounded by the shielding layer 27 in plan view, to be used by the HUD. The HUD display area is a display area on which information is displayed by reflecting a projected image from the interior of the vehicle. The HUD display area is a range, when viewed from a point V1 of JIS R3212, on which the windshield 20 is lit with light from a mirror that constitutes the HUD arranged in the vehicle interior, when the mirror is rotated.

In the windshield 20, the inner surface 21 of the windshield 20 as one of the surfaces of the glass plate 210 on the interior side of the vehicle and an outer surface 22 of the windshield 20 as one of the surfaces of the glass plate 220 on the exterior side of the vehicle may be flat surfaces, or may be curved surfaces.

The windshield 20 is formed in a wedge shape in cross section such that the thickness increases as it extends from the lower end side to the upper end side of the windshield 20 when the windshield 20 is mounted to the vehicle, where δ represents the wedge angle. Such a configuration enables to control double images of the HUD. Note that the wedge angle δ is defined as a value obtained by dividing the difference between the thickness at the lower end and the thickness at the upper end in the vertical direction along the windshield 20, by the distance in the vertical direction along the windshield 20 (i.e., an average wedge angle). In the following, the wedge angles of a glass plate and an interlayer will be similarly defined as above. Note that the increase in thickness from the lower end side to the upper end side of the windshield 20 is a monotonic increase in which the increasing rate may be constant or the increasing rate may vary partially.

The wedge angle δ is favorably greater than or equal to 0.1 mrad and less than or equal to 1.0 mrad. Setting the wedge angle δ to be greater than or equal to 0.1 mrad enables to easily make the degree of thickness difference, which will be defined later in the present disclosure, take a sufficiently great value, and thereby, enables to sufficiently reduce transmitted double images while controlling the HUD double images. Also, setting the wedge angle δ to be less than or equal to 1.0 mrad enables to control an increase in mass of the windshield 20 within a range free of problems. The wedge angle δ is more favorably to be greater than or equal to 0.1 mrad and less than or equal to 0.9 mrad, even more favorably greater than or equal to 0.1 mrad and less than or equal to 0.8 mrad, and still more favorably greater than or equal to 0.1 mrad and less than or equal to 0.6 mrad.

In the windshield 20, when the windshield 20 is mounted to a vehicle, it is favorable that the glass plate 220 is thicker at the upper end than at the lower end, and has a difference in plate thickness between the lower end and the upper end that is greater than equal to 0.1 mm. In other words, the windshield 20 is formed in a wedge shape in cross section such that the thickness increases as it extends from the lower end side to the upper end side of the windshield 20 when the windshield 20 is mounted to the vehicle. The difference in plate thickness between the lower end part and the upper end part of the glass plate 220 is favorably less than or equal to 1.0 mm. Setting the difference in plate thickness between the lower end part and the upper end part of the glass plate 220 to be less than or equal to 1.0 mm enables to prevent an excessive increase in mass of the laminated glass.

The wedge angle of the glass plate 220, namely, the angle between a surface as the outer surface 22 of the windshield 20 and a surface in contact with the interlayer 230, is represented as δg. In FIG. 2A, because the thicknesses of the glass plate 210 and the interlayer 230 are uniform, respectively, the wedge angle δg of the glass plate 220 is equal to the wedge angle δ of the entire laminated glass formed by the inner surface 21 and the outer surface 22 of the windshield 20.

Figure 2B:
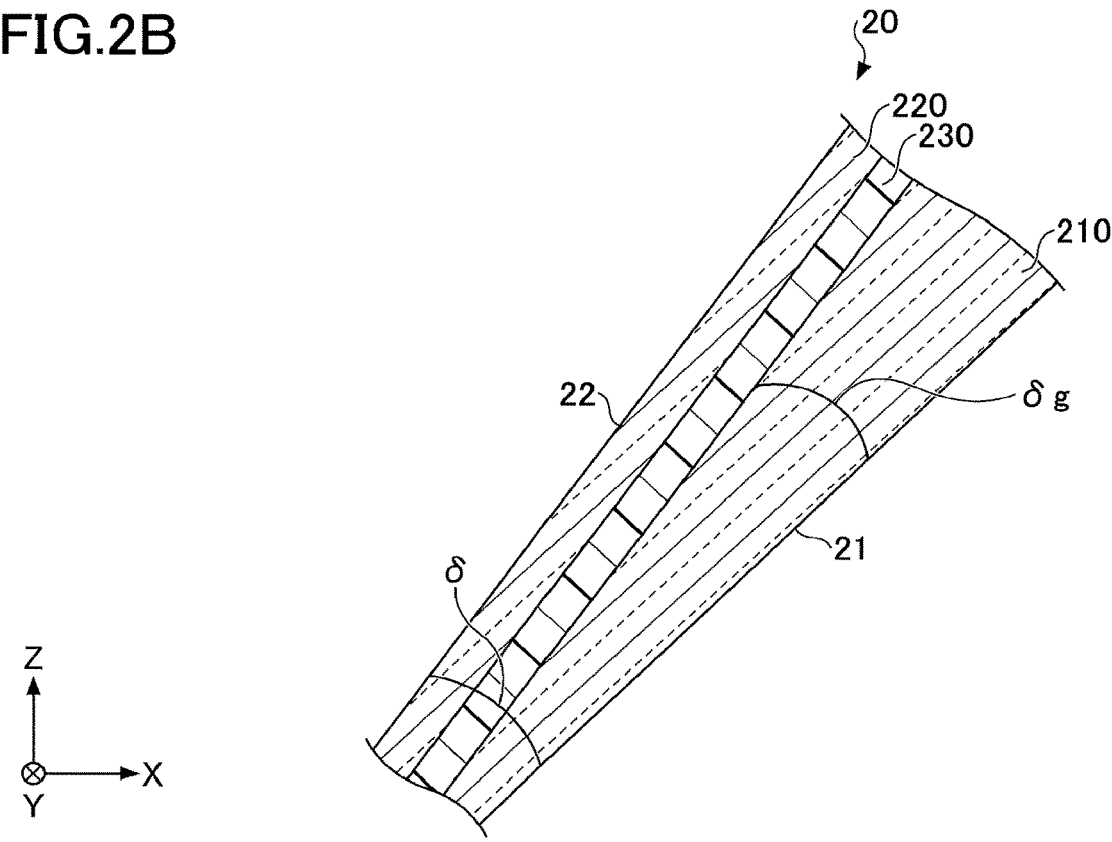

Although FIG. 2A illustrates an example in which the glass plate 220 on the exterior side of the vehicle is formed to have a wedge shape in cross section, as illustrated in FIG. 2B, the glass plate 210 on the interior side of the vehicle may be formed to have a wedge shape in cross section. In other words, the thicknesses of the glass plate 220 and the interlayer 230 are made uniform, respectively, and the glass plate 210 is formed such that the upper end is thicker than the lower end so that the difference in plate thickness between the lower end and the upper end is greater than or equal to 0.1 mm, when mounted to the vehicle. The difference in plate thickness between the lower end part and the upper end part of the glass plate 210 is favorably less than or equal to 1.0 mm. Setting the difference in plate thickness between the lower end part and the upper end part of the glass plate 210 to be less than or equal to 1.0 mm, enables to prevent an excessive increase in mass of the laminated glass. Both of the glass plate 210 and the glass plate 220 may have wedge shapes in cross section as described above.

When the glass plate 210 or 220 has a wedge shape in cross section, the wedge angle δg is favorably greater than or equal to 0.1 mrad and less than or equal to 1.0 mrad, more favorably greater than or equal to 0.1 mrad and less than or equal to 0.9 mrad, even more favorably greater than or equal to 0.1 mrad and less than or equal to 0.8 mrad, and further more favorably greater than or equal to 0.1 mrad and less than or equal to 0.6 mrad. If one of the glass plates 210 and 220 has a wedge shape in cross section, the interlayer 230 may have the wedge shape in cross section described above.

The glass plates 210 and 220 may be manufactured, for example, by a float process. When manufacturing the glass plate 210 or the glass plate 220 by a float process, it can be formed to have a wedge shape in cross section by engineering manufacturing conditions. In other words, by adjusting the revolving speed of multiple rolls arranged on both edges in the width direction of a glass ribbon that travels on molten metal, glass can be formed to have a concave, convex, or tapered cross section in the width direction, which may be cut to obtain a part having a desired thickness change. Alternatively, after the flat glass has been manufactured by a predetermined process, the surface may be polished to have a wedge shape in cross section.

As the glass plates 210 and 220, for example, inorganic glass such as soda lime glass, aluminosilicate glass, or alkali-free glass; organic glass; or the like can be used. In the case where the glass plate 210 or 220 is inorganic glass, it may be strengthened or not. When to be strengthened, it is strengthened by thermal tempering or chemical strengthening.

The plate thickness of the thinnest part of the glass plate 220 positioned on the outside of the windshield 20 is favorably greater than or equal to 1.8 mm and less than or equal to 3 mm. The plate thickness of the glass plate 220 being greater than or equal to 1.8 mm provides a sufficient strength in terms of stone-chip resistance and the like, and the plate thickness being less than or equal to 3 mm prevents the mass of the laminated glass from becoming too heavy, which is favorable in terms of the fuel efficiency of the vehicle. The plate thickness of the thinnest part of the glass plate 220 is more favorably to be greater than or equal to 1.8 mm and less than or equal to 2.8 mm, even more favorably greater than or equal to 1.8 mm and less than or equal to 2.6 mm.

The plate thickness of the glass plate 210 positioned on the inside of the windshield 20 is favorably greater than or equal to 0.3 mm and less than or equal to 2.3 mm. The plate thickness of the glass plate 210 being greater than or equal to 0.3 mm brings a satisfactory handling ability, and being less than or equal to 2.3 mm prevents the mass of the windshield 20 from becoming too heavy.

Setting the thickness of the glass plate 210 to be greater than or equal to 0.3 mm and less than or equal to 2.3 mm enables to maintain the glass quality (e.g., residual stress). Setting the thickness of the glass plate 210 to be greater than or equal to 0.3 mm and less than or equal to 2.3 mm is particularly effective in maintaining the glass quality (e.g., residual stress) of a deeply bent glass. In view of balance between mass and strength, the thickness of the glass plate 210 is more favorably to be greater than or equal to 0.5 mm and less than or equal to 2.1 mm, and even more favorably to be greater than or equal to 0.7 mm and less than or equal to 1.9 mm.

In the case where the windshield 20 has a curved shape, the glass plates 210 and 220 are applied with bending-forming after shaping by the float process or the like and before bonding with the interlayer 230. The bending-forming is performed by softening the glass by heating. The heating temperature of the glass during the bending-forming is approximately 550° C. to 700° C.

As the interlayer 230 that bonds the glass plate 210 and the glass plate 220 together, thermoplastic resin may be used. Such thermoplastic resin includes, for example, plastic polyvinyl acetal resin, plastic polyvinyl chloride resin, saturated polyester resin, plastic saturated polyester resin, polyurethane resin, plastic polyurethane resin, ethylene acetic acid vinyl copolymer resin, and ethylene ethyl acrylate copolymer resin, which are thermoplastic resin conventionally used for this kind of application. Also, a resin composition that contains modified block copolymer hydride, which is described in Japanese Patent No. 6065221, may also be used suitably.

Among these, plastic polyvinyl acetal resin can be suitably used because it has a superior balance of properties including transparency, weather resistance, strength, adhesive strength, penetration tolerance, impact energy absorption, moisture resistance, heat insulation, and acoustic insulation. The thermoplastic resin to be used may be of a single type, or may contain two or more types. The word "plastic" as in the above "plastic polyvinyl acetal resin" means that it is plasticized by adding a plasticizer. The same applies to other plastic resins.

The polyvinyl acetal resin described above may include polyvinyl formal resin obtained by having polyvinyl alcohol (may be referred to as "PVA" below as necessary) react with formaldehyde; polyvinyl acetal resin in a narrow sense obtained by having PVA react with acetaldehyde; and polyvinyl butyral resin (may be referred to as "PVB" below as necessary) obtained by having PVA react with n-butyraldehyde. Among these, in particular, PVB is suitably used because of its superior balance of properties including transparency, weather resistance, strength, adhesive strength, penetration tolerance, impact energy absorption, moisture resistance, heat insulation, and acoustic insulation. Note that the polyvinyl acetal resin to be used may be of a single type, or may contain two or more types. However, the material for forming the interlayer 230 is not limited to the thermoplastic resin.

The layer thickness of the interlayer 230 is favorably greater than or equal to 0.5 mm at the thinnest part. The layer thickness of the interlayer 230 being greater than or equal to 0.5 mm provides a sufficient penetration resistance required as a windshield. Also, the layer thickness of the interlayer 230 is favorably less than or equal to 3 mm at the thickest part. The maximum value of the layer thickness of the interlayer 230 being less than or equal to 3 mm enables to prevent the mass of the laminated glass from becoming too heavy. The maximum value of the layer thickness of the interlayer 230 is more favorably to be less than or equal to 2.8 mm, even more favorably to be less than or equal to 2.6 mm, still more favorably to be less than or equal to 2 mm, and further more favorably less than or equal to 1 mm.

Note that the interlayer 230 may have three or more layers. For example, by forming the interlayer with three layers and setting the hardness of the middle layer to be lower than the hardness of both of the outer layers by adjusting a plasticizer or the like, the sound insulation of the laminated glass can be improved. In this case, the hardness of the two outer layers may be the same or may differ.

In order to produce an interlayer 230, for example, a resin material to form the interlayer is appropriately selected from among those described above, to which extrusion molding is applied in a heated and molten state by using an extruder. The extrusion conditions such as the extrusion rate of the extruder are set to be uniform. After that, in order to give curvature to the upper side and the lower side according to the design of the windshield 20, for example, the resin layer to which the extrusion molding has been applied is extended as necessary, to complete the interlayer 230.

To manufacture a laminated glass, a laminate is formed by sandwiching the interlayer 230 between a glass plate 210 and a glass plate 220, and then, for example, this laminate is placed in a rubber bag to be bonded in a vacuum of −65 to −100 kPa at a temperature of approximately 70 to 110° C.

Further, applying a press-bonding treatment of heating and pressing to the laminate under conditions of, for example, 100 to 150° C. and a pressure of 0.6 to 1.3 MPa, a laminated glass having more excellent durability can be obtained. However, in some cases, this heating and pressing process may not be used to simplify the process and in consideration of the characteristics of the materials put into the laminated glass.

Other than the interlayer 230, as long as the effects in the present disclosure are not impaired, a film or device having a function such as infrared reflection, light emission, power generation, light control, visible light reflection, scattering, decoration, absorption, or the like may be provided between the glass plate 210 and the glass plate 220. Also, a functional film for antifogging, heat shielding, or the like may be provided on the inner surface 21, and a film having a heat shielding function may be provided on the vehicle-interior-side surface of the glass plate 220 or the vehicle-exterior-side surface of the glass plate 210.

Note that FOV (Field Of View) of the HUD is, for example, greater than or equal to 4 degrees by 1 degree. The FOV of the HUD may be set to be greater than or equal to 5 degrees by 1.5 degrees, greater than or equal to 6 degrees by 2 degrees, or greater than or equal to 7 degrees by 3 degrees.

Thus, in the windshield 20, when the windshield 20 is mounted to the vehicle, one of the glass plates 210 and 220 is formed to have a wedge shape in cross section such that the thickness increases when extending from the lower end side to the upper end side of the windshield 20. In other words, one of the glass plates 210 and 220 has the difference in plate thickness between the lower end part and the upper end part that is greater than or equal to 0.1 mm.

In the present disclosure, the test area A located on the lower side and the information acquisition area 25 located on the upper side when the windshield 20 is mounted to a vehicle, have different degrees of thickness difference. Here, the degree of thickness difference in the present disclosure is a ratio of the plate thickness of the glass plate 210 to that of the glass plate 220 at the center of gravity of a target area, for example, the information acquisition area 25 or the test region A, where a smaller thickness at the position of the center of gravity is taken as the denominator. Here, the center of gravity of the target area in the present specification means the center of gravity based on the surface area of the target area of the outer surface 22 of the windshield 20.

In the windshield 20, denoting the degree of thickness difference of the information acquisition area 25 by $\alpha$, and the degree of thickness difference of the test area A by $\beta$, the degree of thickness difference $\alpha$ is designed to be greater than the degree of thickness difference $\beta$.

In general, because glass for vehicles has a curved surface, when the difference in plate thickness between the glass plate 210 and the glass plate 220 becomes great, due to a difference in the way of bending between the glass plate 210 and the glass plate 220 caused by the bending-forming when manufacturing the windshield 20, transmitted distortion is likely to occur when formed as a laminated glass. In other words, by reducing the difference in plate thickness (or the degrees of thickness difference) between the glass plate 210 and the glass plate 220, the difference in the way of bending between the glass plate 210 and the glass plate 220 when manufacturing the windshield 20 becomes smaller, and it becomes possible to control the occurrence of transmitted distortion. In particular, the effect of the present disclosure is further enhanced when the radius of curvature in the longitudinal direction at the position of the center of gravity of the information acquisition area 25 is less than or equal to 20,000 mm, and the radius of curvature in the longitudinal direction at the position of center of gravity of the test area A is less than or equal to 20,000 mm.

However, the inventors have found that a tendency that a smaller degree of thickness difference better controls the occurrence of transmitted distortion applies to the test area A, but does not hold for the information acquisition area 25. In other words, the inventors have found that unlike in the test area A, in the information acquisition area 25, a greater degree of thickness difference better controls the occurrence of transmitted distortion. It can be considered that, unlike the test area A, the information acquisition area 25 is affected by the presence of the shielding layer 27 around it, which is made of a colored ceramic layer.

In the windshield 20, $\alpha$ and $\beta$ are set such that the ratio $\alpha/\beta$ of the degrees of thickness difference is greater than or equal to 1.01. Within a range in which the ratio $\alpha/\beta$ of the degrees of thickness difference is greater than or equal to 1.01, the degree of thickness difference $\alpha$ of the information acquisition area 25 is favorably greater than or equal to 1.1, more favorably greater than or equal to 1.15, and even more favorably greater than or equal to 1.2. Having the degree of thickness difference $\alpha$ of the information acquisition area 25 contained within the above range, enables to sufficiently control the transmitted distortion of the information acquisition area 25. The degree of thickness difference $\alpha$ of the information acquisition area 25 is favorably less than or equal to 2 from the viewpoint of formability when forming a laminated glass from two glass plates.

Also, the degree of thickness difference $\beta$ of the test area A is favorably less than 1.25, and more favorably less than 1.2. If the degree of thickness difference $\beta$ of the test area A is within the above range, a better formability is realized when forming a laminated glass from two glass plates. Also, the degree of thickness difference $\beta$ of the test area A is favorably greater than or equal to 1.01 because the degree of thickness difference $\alpha$ of the information acquisition area 25 can be contained within a predetermined range without excessively enlarging the wedge angle of the glass plate.

Setting the ratio $\alpha/\beta$ of the degrees of thickness difference to be greater than or equal to 1.01, enables control of the transmitted distortion in the test area A to be compatible with control of the transmitted distortion in the information acquisition area 25. The value of 1.01 of the ratio $\alpha/\beta$ of the degrees of thickness difference is based on actual measurement values obtained as results of accumulation of studies conducted by the inventors (see Examples as will be described later).

The ratio $\alpha/\beta$ of the degrees of thickness difference is favorably greater than or equal to 1.02, more favorably greater than or equal to 1.03, even more favorably greater than or equal to 1.035, and particularly favorably greater than or equal to 1.04. This is because a greater value of the ratio $\alpha/\beta$ of the degrees of thickness difference can further better control the transmitted distortion in the test area A, and can further better control the transmitted distortion in the information acquisition area 25. It is favorable to set the ratio $\alpha/\beta$ of the different thicknesses to be less than or equal to 2 because it is not necessary to excessively enlarge the wedge angle of one of the glass plates 210 and 220, and the glass plate having the wedge angle can be manufactured without a defect such as distortion.

Note that the significance of setting the ratio $\alpha/\beta$ of degrees of thickness difference to be greater than or equal to 1.01 becomes even higher because a smaller value of the angle $\theta$ between the optical axis O of the camera 300 and the inner surface 21 of the windshield 20 emphasizes the transmitted distortion as viewed from the camera 300. It is favorable that $\theta$ is less than or equal to 30 degrees and the ratio $\alpha/\beta$ of the degrees of thickness difference is greater than or equal to 1.02, and it is more favorable that $\theta$ is less than or equal to 25 degrees and the ratio $\alpha/\beta$ of the degrees of thickness difference is greater than or equal to 1.03.

Modified Example of First Embodiment

As a modified example of the first embodiment, an example will be described in which the shape of the information acquisition area is different from that in the first embodiment. Note that in the modified example of the first embodiment, the description may be omitted for the same elements as those in the embodiment already described.

Figure 3A:
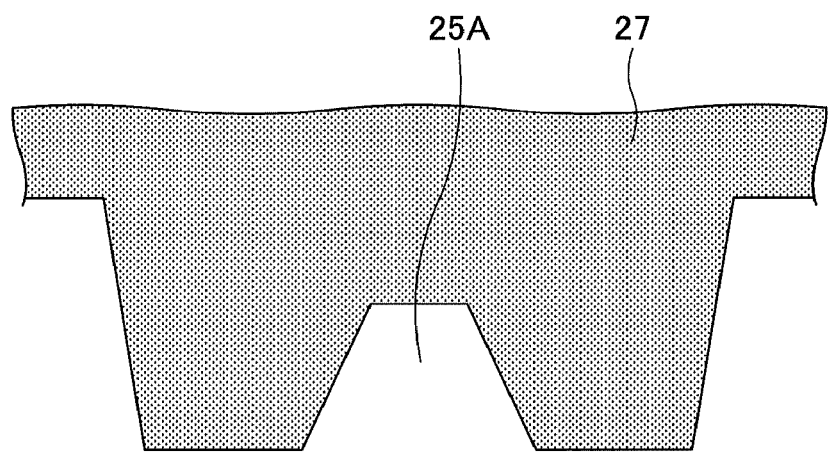
FIGS. 3A-3B are partially enlarged views of the vicinity of an information acquisition area according to a modified example of the first embodiment.
Figure 3B:
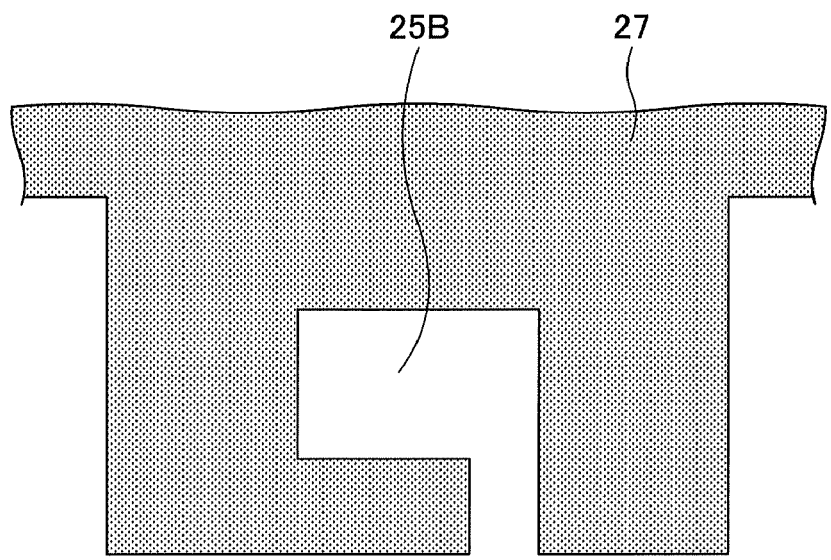

FIGS. 3A-3B are partially enlarged views of the vicinity of an information acquisition area according to the modified example of the first embodiment. Although the entire peripheral part of the information acquisition area 25 is surrounded by the shielding layer 27 in plan view in the first embodiment, the present inventive concept is not limited as such; at least a part of the peripheral part of the information acquisition area 25 may be surrounded by the shielding layer 27 in plan view.

For example, as in the case of an information acquisition area 25A illustrated in FIG. 3A and of an information acquisition area 25B illustrated in FIG. 3B, a part of the peripheral part is surrounded by the shielding layer 27 and the rest of the peripheral part is not surrounded by the shielding layer 27. For example, like a slit-like opening, an area where the shielding layer 27 is discontinuous, may be provided in the shielding layer 27 surrounding the entire peripheral part of the information acquisition area 25. The center of gravity of the information acquisition area 25 in this case may be obtained as the center of gravity of the area enclosed by lines connecting the vertices of the opening. Also, in the case where there are multiple information acquisition areas 25, each of information acquisition areas simply needs to satisfy the relationship of the present inventive concept.

Further, although the planar shape of the information acquisition area 25 is rectangular in the first embodiment, it is not limited as such. For example, as in the case of the information acquisition area 25A illustrated in FIG. 3A, the planar shape may be an isosceles trapezoid, or may be another planar shape.

Examples 1-4 and Comparative Example

Two glass plates (manufactured by AGC Inc., known as FL) were prepared, which serve as an outer plate (a glass plate on the vehicle-exterior side) and an inner plate (a glass plate on the vehicle-interior side), respectively, when formed into a laminated glass. The dimensions of both of the glass plates were set to 1,200 mm for the upper side, 1,400 mm for the lower side, and 1,000 mm for the height, so as to be an isosceles trapezoid in plan view. A colored ceramic layer as illustrated in FIG. 1A was formed on the vehicle-interior-side surface of the inner plate. The information acquisition area 25 is formed as an isosceles trapezoidal opening having an upper side of 20 mm, a lower side of 80 mm, and a height of 80 mm in plan view. The two glass plates were applied with bending-forming in advance so as to have a predetermined curvature. An interlayer (0.76-mm thick PVB manufactured by Sekisui Chemical Co., Ltd.) was sandwiched between the two glass plates, heated under vacuum to be temporarily pressure-joined, and then, press-bonded by an autoclave treatment to produce a windshield.

By the above process, windshields were produced, each of which has an information acquisition area 25 and a test area A (see FIG. 1 and FIG. 2), to evaluate the transmitted distortions for the information acquisition area 25 and for the test area A (Comparative example, Example 1-Example 4). Note that in Comparative example, Example 1-Example 4, the respective outer plates were formed to have wedge shapes in cross section having different wedge angles, so as to have different values of the degree of thickness differences α of the information acquisition area 25, the degree of thickness difference β of the test region A, and the ratio α/β of the degrees of thickness difference. The radius of curvature in the longitudinal direction at the position of the center of gravity of the information acquisition area was 2,000 mm, and the radius of curvature in the longitudinal direction at the position of the center of gravity of the test area A was 9,000 mm.

FIG. 4 and FIG. 5 were compiled to summarize the values of the degree of thickness differences α of the information acquisition area 25, the degree of thickness difference β of the test region A, and the ratio α/β of the degrees of thickness difference; and evaluation results with respect to the maximum values of the absolute values of the transmitted distortions of the information acquisition area 25 and the test area A in Comparative example and Examples 1 to 4. Note that the transmitted distortion is represented by the refractivity of the lens effect of the laminated glass where a positive value represents an effect of a convex lens, a negative value represents an effect of a concave lens, and a value closer to zero represents a smaller transmitted distortion. The transmitted distortion was measured by a distortion inspection device manufactured by ISRA VISION AG.

As illustrated in FIGS. 4 and 5, in Comparative example in which the ratio α/β of the degrees of thickness difference is 1.006, the transmitted distortion of the test area A is satisfactory, but the transmitted distortion of the information acquisition area 25 exceeds an allowable value. Here, according to the results of accumulation of studies conducted by the inventors, the allowable value of the transmitted distortion is less than or equal to 140 mdpt in absolute value for both of the information acquisition area 25 and the test area A.

In contrast, in Example 1 in which the ratio α/β of the degrees of thickness difference is 1.047; in Example 2 in which the ratio α/β of the degrees of thickness difference is 1.035; in Example 3 in which the ratio α/β of the degrees of thickness difference is 1.014; and in Example 4 in which the ratio α/β of the degrees of thickness difference is 1.025, the respective transmitted distortions of the test areas A were within the allowable value even though greater than that in Comparative example. Also, the transmitted distortions of the information acquisition areas 25 were smaller than that in Comparative example, and were within the range of allowable value.

As such, in the test area A, a greater ratio α/β of the degrees of thickness difference tends to exhibit a greater transmitted distortion (arrow M in FIG. 5), whereas in the information acquisition area 25, a greater ratio α/β of the degrees of thickness difference tends to exhibit a smaller transmitted distortion (arrow N in FIG. 5). In addition, from FIG. 5, it can be understood that setting the ratio α/β of the degrees of thickness difference to be greater than or equal to 1.01, enables to control both of the transmitted distortion of the test area A and the transmitted distortion of the information acquisition area 25 within the range of allowable value.

In other words, in a laminated glass, setting the ratio α/β of the degrees of thickness difference to be greater than or equal to 1.01, enables to control both of the transmitted distortion of the test area A and the transmitted distortion of the information acquisition area 25 within the range of allowable value. Also, because the laminated glass has a wedge shape in cross section, double images of the HUD can also be controlled.

As above, the preferred embodiments and the like have been described in detail. Note that the present inventive concept is not limited to the embodiments and the like described above, which may be changed and replaced in various ways without departing from the scope described in the claims.

The invention claimed is:

1. A laminated glass comprising:
an interlayer between a vehicle-exterior-side glass plate and a vehicle-interior-side glass plate;
an information acquisition area for a sensor; and
a test area A specified in JIS R3212 (2015),
wherein the information acquisition area is positioned higher than the test area A when the laminated glass is mounted to a vehicle,
wherein at least a part of a peripheral part of the information acquisition area is surrounded by a shielding layer formed of a colored ceramic layer in plan view,
wherein one of the vehicle-exterior-side glass plate and the vehicle-interior-side glass plate has a plate thickness thicker at an upper end part than at a lower end part when the laminated glass is mounted to the vehicle,
wherein denoting a degree of thickness difference of the information acquisition area by α and a degree of thickness difference of the test area A by β, a ratio α/β of the degree of thickness difference is greater than or equal to 1.010, and β is less than 1.250,
wherein α is a ratio of a thickness of the vehicle-exterior-side glass plate to a thickness of the vehicle-interior-side glass plate at a center of gravity of the information acquisition area (a smaller thickness is taken as a denominator), and β is a ratio of a thickness of the vehicle-exterior-side glass plate to a thickness of the vehicle-interior-side glass plate at a center of gravity of the test area A (a smaller thickness is taken as a denominator), and
wherein the laminated glass has a transmitted distortion of 0 to −140 mdpt in the information acquisition area, wherein a negative value of distortion represents an effect of a concave lens.

2. The laminated glass as claimed in claim 1, wherein the ratio α/β of the degrees of thickness difference is greater than or equal to 1.030.

3. The laminated glass as claimed in claim 1, wherein the degree of thickness difference α is greater than or equal to 1.100.

4. The laminated glass as claimed in claim 1, wherein among the vehicle-exterior-side glass plate and the vehicle-interior-side glass plate, in a glass plate having a difference in plate thickness greater than or equal to 0.1 mm between the lower end part and the upper end part, the difference in plate thickness is less than or equal to 1.0 mm between the lower end part and the upper end part.

5. The laminated glass as claimed in claim 1, wherein the shielding layer is provided on one of or both of a vehicle-interior-side surface of the vehicle-interior-side glass plate and a vehicle-interior-side surface of the vehicle-exterior-side glass plate.

6. The laminated glass as claimed in claim 1, wherein an entirety of a peripheral part of the information acquisition area is surrounded by the shielding layer in plan view.

7. The laminated glass as claimed in claim 1, wherein a part of a peripheral part of the information acquisition area is surrounded by the shielding layer in plan view, and rest of the peripheral part is not surrounded by the shielding layer.

8. The laminated glass as claimed in claim 1, wherein an area of a part surrounded by the shielding layer of the information acquisition area is greater than or equal to 1,500 mm².

9. The laminated glass as claimed in claim 1, wherein a plate thickness of the vehicle-exterior-side glass plate is greater than or equal to 1.8 mm at a thinnest part.

10. The laminated glass as claimed in claim 1, wherein a plate thickness of the vehicle-interior-side glass plate is less than or equal to 2.3 mm.

11. The laminated glass as claimed in claim 1, wherein a plate thickness of the vehicle-interior-side glass plate is less than or equal to 2.1 mm.

12. The laminated glass as claimed in claim 1, wherein a plate thickness of the vehicle-interior-side glass plate is less than or equal to 1.9 mm.

13. The laminated glass as claimed in claim 1, wherein the degree of thickness difference $\beta$ is less than 1.200.

14. The laminated glass as claimed in claim 1, wherein the degree of thickness difference $\beta$ is 1.166 to 1.201.

15. The laminated glass as claimed in claim 1, wherein the degree of thickness difference $\alpha$ is 1.217 to 1.234.

16. The laminated glass as claimed in claim 1, wherein the ratio $\alpha/\beta$ of the degrees of thickness difference is 1.014 to 1.047.

17. The laminated glass as claimed in claim 1, wherein:
the degree of thickness difference $\beta$ is 1.166 to 1.201;
the degree of thickness difference $\alpha$ is 1.217 to 1.234; and
the ratio $\alpha/\beta$ of the degrees of thickness difference is 1.014 to 1.047.

18. The laminated glass as claimed in claim 1, wherein the laminated glass has a transmitted distortion of less than or equal to 140 mdpt in absolute value in the test area A.

* * * * *